United States Patent
Koller et al.

(10) Patent No.: US 6,290,752 B1
(45) Date of Patent: Sep. 18, 2001

(54) DEVICE AND PROCESS FOR ADSORPTION OR CHEMISORPTION OF GASEOUS CONSTITUENTS FROM A GAS FLOW

(75) Inventors: Felix Koller, Schinznach-Dorf; Rudolf Frey, Effretikon; Rainer Flury, Oensingen, all of (CH)

(73) Assignee: Von Roll Umwelttechnik AG, Zurich (CH)

( * ) Notice: Subject to any disclaimer, the term of this patent is extended or adjusted under 35 U.S.C. 154(b) by 0 days.

(21) Appl. No.: 09/416,293

(22) Filed: Oct. 14, 1999

(30) Foreign Application Priority Data

Oct. 22, 1998 (CH) .................................................. 2131/98

(51) Int. Cl.⁷ ............................. B01D 29/27; B01D 53/06
(52) U.S. Cl. ................................ 95/107; 95/278; 96/109; 96/150; 96/417; 55/338; 55/341.2; 55/430
(58) Field of Search .................................. 95/19, 20, 22, 95/107, 278, 280; 96/113, 123, 150, 417; 55/302, 338, 341.2, 430

(56) References Cited

U.S. PATENT DOCUMENTS

| Re. 24,954 | * | 3/1961 | Church | 95/280 |
|---|---|---|---|---|
| 530,445 | * | 12/1894 | Newby et al. | 55/341.2 X |
| 2,098,024 | * | 11/1937 | Bailey | 55/430 X |
| 2,635,949 | * | 4/1953 | Fenske et al. | 96/150 X |
| 4,042,667 | * | 8/1977 | Ishiwata et al. | 95/278 X |
| 4,191,544 | * | 3/1980 | Boll et al. | 96/150 |
| 4,432,776 | * | 2/1984 | Hölter et al. | 95/107 |
| 4,973,458 | * | 11/1990 | Newby et al. | 95/278 X |
| 5,419,877 | * | 5/1995 | Goforth et al. | 96/150 X |
| 5,505,763 | * | 4/1996 | Reighard et al. | 95/19 |
| 5,607,649 | * | 3/1997 | Hansen | 96/150 X |

FOREIGN PATENT DOCUMENTS

| 34 09 140 | 10/1985 | (DE) . |
|---|---|---|
| 39 25 818 | 2/1991 | (DE) . |
| 476 300 | 3/1992 | (EP) . |
| 2 626 192 | 7/1989 | (FR) . |

* cited by examiner

Primary Examiner—Robert H. Spitzer
(74) Attorney, Agent, or Firm—Cohen, Pontani, Lieberman & Pavane

(57) ABSTRACT

A filter device for adsorption of gaseous constituents from a gas flow includes a filter chamber with filters arranged therein, a clean-gas chamber connected to the first chamber in a fluid-conducting manner via the filters, and a collection chamber arranged beneath the filter chamber, is open toward the filter chamber and has an interior which narrows toward the bottom. An unfiltered-gas duct which leads from the outside, is arranged in the lower area of the collection chamber in such a manner that it can be adjusted in the direction toward the filters. A dust-discharge device, which leads toward the outside, is arranged in the lower area.

14 Claims, 2 Drawing Sheets

DEVICE AND PROCESS FOR ADSORPTION OR CHEMISORPTION OF GASEOUS CONSTITUENTS FROM A GAS FLOW

BACKGROUND OF THE INVENTION

1. Field of the Invention

The invention relates to a device for adsorption or chemisorption of gaseous constituents from a gas flow. The invention furthermore relates to a process for adsorption or chemisorption of gaseous constituents from a gas flow.

2. Description of the Related Art

The publication EP 0,476,300 B1 has disclosed a device and a process for adsorption or chemisorption of gaseous constituents from a gas flow. A drawback of this device and process is that the dust return rate is difficult to maintain, since it is determined by the amount of dust located in the separation plant. A further drawback is the fact that the dusts can only be removed off-line, with the result that a filter chamber has to be taken out of on-line mode into off-line mode, then the filter chamber has to be emptied, in order for the filter chamber then to be returned to the on-line mode.

SUMMARY OF THE INVENTION

The object of the present invention is to provide a device which is economically more advantageous and a process which is economically more advantageous than the prior art devices and processes.

The object is achieved in particular by means of a filter device for adsorption of gaseous constituents from a gas flow, comprising a filter chamber with filters arranged therein, a clean-gas chamber, which is connected to the filter chamber in a fluid-conducting manner via the filters, and a collection chamber, which is arranged beneath the filter chamber, is open toward the filter chamber and has an interior which narrows toward the bottom. An unfiltered-gas duct, which leads from the outside, is arranged in the lower area of the collection chamber, in such a manner that it can be adjusted in the direction toward the filters. Furthermore, a dust-discharge device, which leads toward the outside, is arranged in the lower area.

The unfiltered-gas duct, which can be adjusted in the filter chamber, in particular in the vertical direction, has the advantage that the dust located in the lower area of the collection chamber is picked up by the unfiltered gas flowing in, is thrown upward and, in this way, is recirculated in the filter chamber. The adjustability of the position of the unfiltered-gas duct makes it possible to set the amount of dust which is recirculated. If the unfiltered-gas duct opens out at a relatively low level into the filter chamber, a relatively large proportion of the dust which has collected in the lower area of the filter chamber is picked up and recirculated. If the unfiltered-gas duct opens out at a relatively high level in the filter chamber, the unfiltered gas flowing in has scarcely any entraining action on the dust which is collected in the lower area of the filter chamber, with the result that a relatively small amount of dust is recirculated in the filter chamber. The position of the unfiltered-gas duct, and consequently the amount of dust which is recirculated, can be set using a drive device arranged outside the filter chamber. In addition, a discharge device is arranged in the lower area of the filter chamber allowing the accumulated dust to be removed from the filter chamber in a controllable manner. This discharge device makes it possible to set the total amount of dust or adsorbent located in the filter chamber.

The effect of the dust being entrained by the unfiltered gas which flows in may be influenced within wide limits using additional, suitably arranged flow-influencing means. For example, the untreated-gas duct may open out into a guide element which is, for example, of tubular design. If the unfiltered-gas duct opens out at a relatively low level into the guide element, resulting in a correspondingly low penetration depth, little sucking action is generated in the guide element and little dust is sucked in by the guide element. On the other hand, if the unfiltered-gas duct opens out into the guide element at a relatively high level, so that the unfiltered-gas duct extends over a relatively long distance within the guide element, a greater sucking action is thus generated in the guide element and correspondingly more dust is sucked in by the guide element.

The filter device according to the invention thus makes it possible to set the total amount of dust located in the filter chamber using the discharge device. Moreover, by adjusting the unfiltered-gas duct, it is possible to set the flow of dust, i.e., the mass of dust which is recirculated per unit time in the filter device. In addition to these advantageous setting options, the filter device according to the invention has the advantage that it does not have to be shut down in order for the dust to be removed. The high dust density which is possible or the high recirculation rate which is possible in the filter chamber makes it possible to clean the unfiltered gas very well.

In an advantageous configuration, ceramic filter candles are arranged in the filter device, providing the additional advantage that the device can be operated with flue-gas temperatures of up to 850° C.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
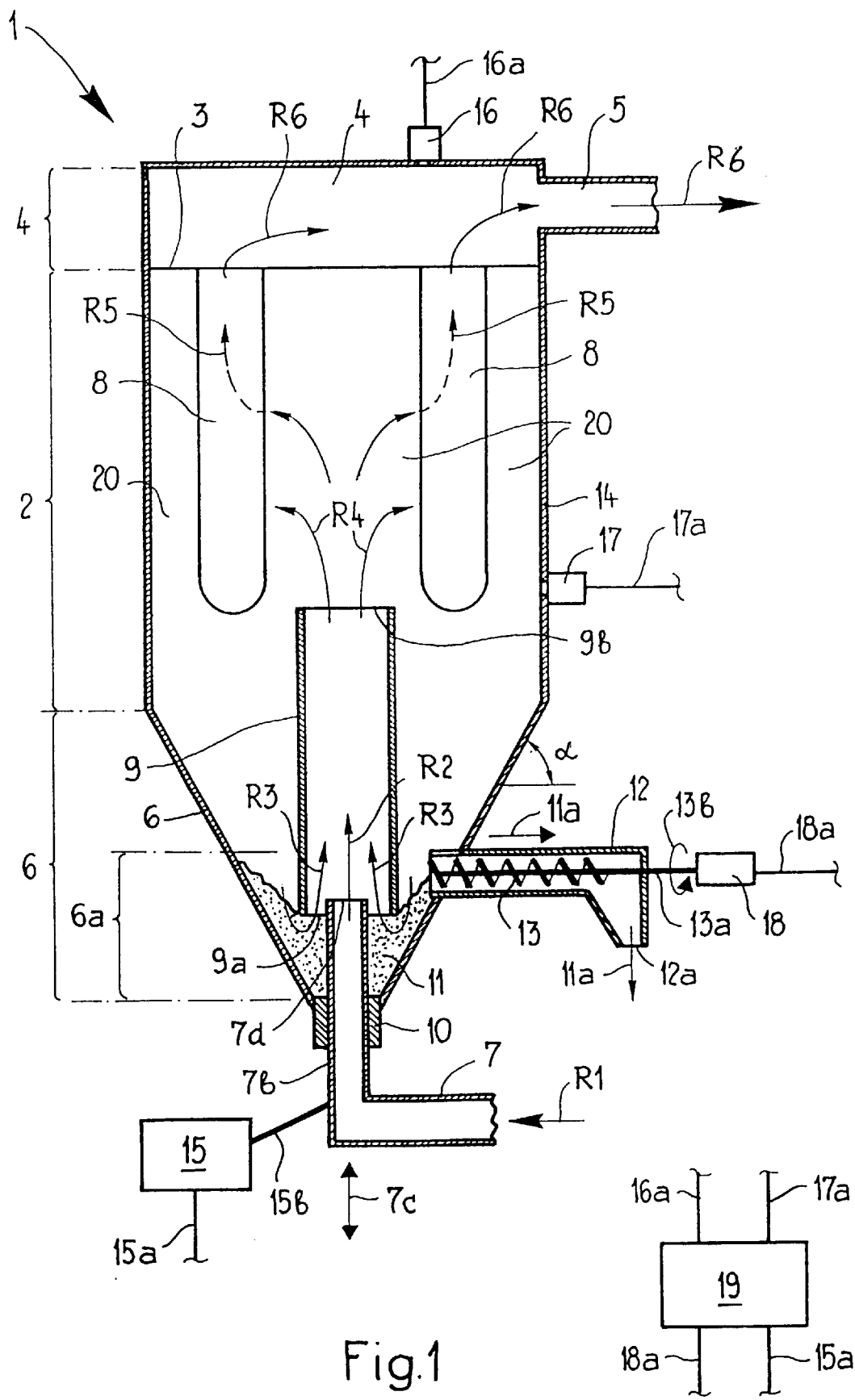
FIG. 1 shows a cross-section through a filter device pursuant to the present invention.

FIG. 1 shows a filter device 1 which comprises a filter chamber 2, also referred to as a separation chamber, which is open at the bottom, leading into a collection chamber 6. In its lower area 6a, the collection chamber 6 has an interior which narrows toward the bottom and in the embodiment illustrated is designed so as to run conically. A sealing element 10, in which an unfiltered-gas duct 7b, 7 is mounted in such a manner that it can be displaced in direction 7c, is arranged at the very bottom of the collection chamber 6. In the example illustrated, the direction of displacement 7c runs in the vertical direction. Outside the filter device 1, there is a drive device 15 which can be activated via an electric cable 15a, is coupled to the unfiltered-gas duct 7b via a mechanical means 15b and allows the height of the unfiltered-gas duct 7b to be adjusted in direction 7c. This height adjustment adjusts the position of the outlet opening 7d of the unfiltered gas duct 7b in the collection chamber 6.

As shown, the dust which is contained in the unfiltered gas R1 or is fed to the unfiltered gas accumulates in the bottom area of the collection chamber 6; adsorbents or chemiadsorbents are also referred to as dust. The outlet opening 7d acts as a nozzle through which the unfiltered gas R2 flows into the collection chamber 6 and then into the filter chamber 2. The position of the outlet opening 7d in relation to the level of the accumulated dust 11 influences the amount of dust which is picked up by the unfiltered-gas flow R2 per unit time and is thrown upward as gas mixture R4 and recirculated. In the interior 20 of the filter chamber 2, there are filters 8 which are connected in a fluid-conductive manner to a clean-gas chamber 4 arranged above. The clean-gas chamber 4 is separated from the filter chamber 2 by a wall 3 so that flow is possible to the chamber 4 only through the filters 8. Some of the gas mixture R4 flows into the filters 8, dust particles being deposited on the surface of these filters, and the gas R5 which has been filtered in this way passes into the clean-gas duct 5, via the clean-gas chamber 4, as clean gas R6. The dust particles which fall off the filters 8 accumulate in the collection chamber 6. The filters may be designed as bag filters or as cloth filters. In a particularly advantageous configuration of the filter device 1, the filters 8 are designed as ceramic filters.

Advantageously, a guide element 9 which, in conjunction with the unfiltered-gas duct 7b, brings about a sucking action is arranged in the interior of the filter device 1. The guide element 9 has an outlet 9B. The unfiltered-gas duct 7b and the tubular guide element 9 are arranged in such a manner with respect to one another that the unfiltered-gas duct 7b can be pushed into the guide element, so that the sucking action of the guide element can be set owing to the displaceability of the unfiltered-gas duct 7b in direction 7c. It is thus possible to set the amount of recirculation gas R3, and thus also the amount of recirculated dust, per unit time. In the example illustrated, the opening 7d projects into the mouth 9a of the guide element 9 and forms a passage 9c. However, the opening 7d could also be arranged outside the guide element 9, below the inlet opening 9a. In order to have an additional influence on the action of the guide element, the guide element 9 itself could also be mounted so as to be vertically adjustable in the direction of movement 7c and, if appropriate, controllable. The guide element 9 may, for example, be of circular, rectangular or square cross-section.

Moreover, in the lower area 6a there is a discharge device 12 which has a worm 13 which can be rotated about a shaft 13a in direction 13b, by means of which worm the dust 11 can be conveyed through the discharge opening 12a, in the conveying direction 11a, and can thus, be removed from the interior of the filter device 1. In this way, it is possible to influence, in a controllable manner, the total amount of dust located in the interior of the filter device 1.

The filter device 1 can, for example, be controlled as follows. A pressure sensor 17 is provided at a wall 14 of the filter chamber in order to measure the interior pressure of the filter chamber 2. A second pressure sensor 16 is provided in order to measure the pressure in the clean-gas chamber 4. A control device 19, which is connected to the sensors 16, 17 via electric lines 16a, 17a, determines the differential pressure and compares the latter with a predetermined desired differential pressure. As soon as the differential pressure exceeds the desired value, the drive device 18 is started up via the electric line 18a, and a quantity of dust 11 is removed from the collection chamber 6 in the conveying direction 11a. In addition to or instead of the discharge device, the control device 19 may also actuate the drive device 15 via the electric line 15a and may change the position of the unfiltered-gas duct 7b in such a manner that the flow of dust, i.e., the amount of dust recirculated per unit time, is reduced.

In addition, the filters 8 can be cleaned by actuating fluid nozzles which are not shown but which act on the filters 8.

The angle of inclination α of the wall of the collection chamber 6 is to be selected to be sufficiently large to ensure that the dust 11 accumulates in the lower area 6a. The filter device 1 in accordance with FIG. 1 could also have a significantly greater diameter, in which case it is possible to arrange a significantly greater number of ceramic filters 8 in the filter chamber 2. To ensure a sufficiently large angle of inclination α, a correspondingly high collection chamber 6 is required in this configuration.

Figure 2:
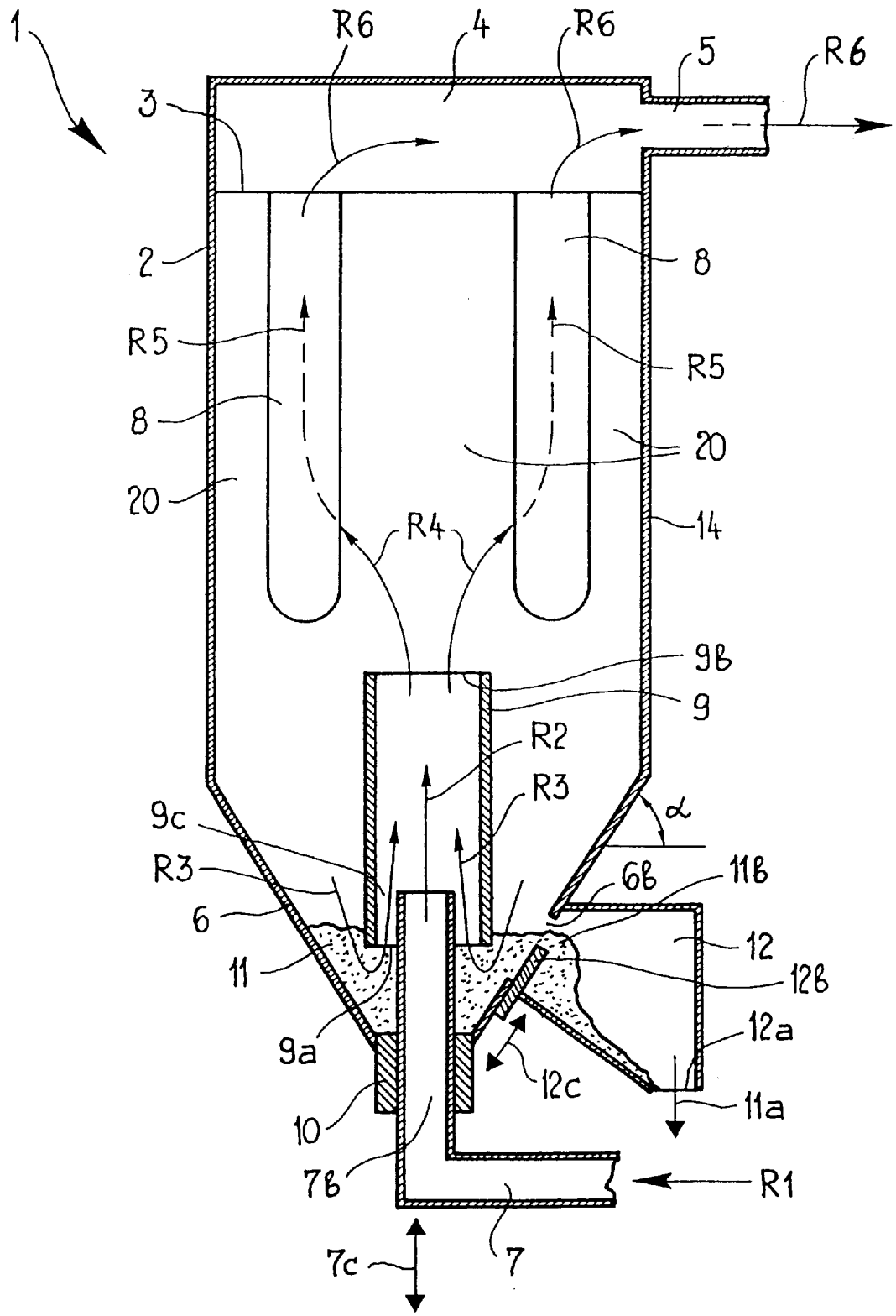
FIG. 2 shows a cross-section through a further embodiment of a filter device.

FIG. 2, in which the design of the filter device 1 is otherwise the same as in FIG. 1, shows a further exemplary embodiment of a discharge device 12. The collection chamber 6 has an opening 6B at which the discharge device 12 is arranged. The discharge device 12 comprises a lock gate part 12b, which can be adjusted in direction 12c and makes it possible to adjust the clear width of the opening, so that more or less dust 11 is removed via the interruption point 11b which is formed and is discharged in the conveying direction 11a.

It is possible for a plurality of filter devices 1 to be arranged in a filter installation, via closeable valves. This makes it possible to shut down individual filter devices 1, in order to allow the ceramic filters to be regenerated. Fluid nozzles which are directed at the ceramic filters 8 may be arranged in the filter device 1, which nozzles allow gas to be blown at the ceramic filters in order to clean off adhering dust. This gas is preferably supplied from the clean-gas side. The ceramic filters, which are also known as filter candles, may have a relatively small structural height of, for example, 2 meters, making it possible to produce a filter device 1 of low structural height.

In the dry adsorption according to the invention, an additive is admixed with the unfiltered gas, and the pollutants contained in the unfiltered gas, for example chlorides, sulfates, mercury or fluorine, are bound to the additive. The filter device 1 according to the invention allows the dust to be recirculated at a high velocity, leading to a high level of turbulent mixing in the filter chamber 2, so that there is a high probability of contact between the adsorbent and the pollutants, resulting in good cleaning of the unfiltered gas.

The invention is not limited by the embodiments described above which are presented as examples only but can be modified in various ways within the scope of protection defined by the appended patent claims.

We claim:

1. A process for adsorption or chemisorption of gaseous constituents from an unfiltered gas flow comprising the step of feeding the unfiltered gas flow to a separation device where dusts are separated out and precipitated, the unfiltered gas flow being fed to the separation device so that an amount of precipitated dust which is recirculated in the separation device can be controlled during operation.

2. The process as defined in claim 1, including setting the amount of precipitated dust which is recirculated by adjusting a height at which the unfiltered gas flow enters the separation device.

3. The process as defined in claim 1, including setting the amount of precipitated dust which is recirculated by removing some of the precipitated dust during operation of the separation device.

4. A filter device for adsorption of gaseous constituents from a gas flow, comprising:

a filter chamber;

filters arranged in the filter chamber;

a clean-gas chamber connected to the filter chamber in a fluid-conducting manner via the filters;

a collection chamber arranged beneath the filter chamber so as to open toward the filter chamber, the collection chamber being configured to have an interior which narrows in a downward direction;

an unfiltered-gas duct which leads from outside the filter device is arranged in a lower area of the collection chamber so that the unfiltered-gas duct can be adjusted in a direction toward the filters; and a dust-discharge device, which leads toward the outside, arranged in the lower area of the collection chamber.

5. The filter device as defined in claim 4, wherein the filter is a ceramic filter.

6. The filter device as defined in claim 4, wherein the filter is a bag filter.

7. The filter device as defined in claim 4, and further comprising a tubular guide element arranged at least in the collection chamber so as to run in the direction toward the filters, the guide element and the unfiltered-gas duct are arranged and designed with respect to one another so that the unfiltered-gas duct opens out into the guide element and a gap which runs in the direction toward the filters is formed between the guide element and the unfiltered-gas duct.

8. The filter device as defined in claim 4, and further comprising a sealing element arranged at a bottom end of the collection chamber, the unfiltered-gas duct being movably arranged in the sealing element so that the duct can be adjusted in the direction toward the filter.

9. The filter device as defined in claim 4, wherein the collection chamber has an inclined inner wall.

10. The filter device as defined in claim 9, wherein the inner wall is conical.

11. The filter device as defined in claim 4, wherein the discharge device is a drivable conveyor worm.

12. The filter device as defined in claim 4, wherein the collection chamber has a wall with an opening therein, the discharge device including a movable cover device movably arranged at the opening for affecting opening and closing of the opening.

13. The filter device as defined in claim 4, and further comprising means for changing position of the unfiltered-gas duct in the direction of the filters.

14. The filter device as defined in claim 4, and further comprising sensors for determining a quantity of dust and outputting corresponding signals, drive means for actuating the position of the unfiltered-gas duct and of the discharge device, and an activation device which detects the signals from the sensors and activates the drive means.

* * * * *